(12) United States Patent
Banna et al.

(10) Patent No.: US 8,804,885 B2
(45) Date of Patent: Aug. 12, 2014

(54) DELAY COMPENSATION IN EQUALIZER-BASED RECEIVER

(75) Inventors: Rami Banna, Kensington (AU); Adriel P. Kind, Macquarie Park (AU); Tomasz Prokop, San Jose, CA (US); Dominic W. Yip, Carlingford (AU); Gongyu Zhou, North Epping (AU)

(73) Assignee: Agere Systems LLC, Allentown, PA (US)

( * ) Notice: Subject to any disclaimer, the term of this patent is extended or adjusted under 35 U.S.C. 154(b) by 1814 days.

(21) Appl. No.: 11/311,003

(22) Filed: Dec. 19, 2005

(65) Prior Publication Data
US 2007/0140320 A1 Jun. 21, 2007

(51) Int. Cl.
*H04B 1/10* (2006.01)

(52) U.S. Cl.
USPC ............ 375/350; 375/147; 375/316; 375/354

(58) Field of Classification Search
USPC .................................................. 375/148, 229
See application file for complete search history.

(56) References Cited

U.S. PATENT DOCUMENTS

| | | | | |
|---|---|---|---|---|
| 5,268,930 A * | 12/1993 | Sendyk et al. | ................ | 375/231 |
| 5,475,713 A * | 12/1995 | Bremer et al. | ................ | 375/261 |
| 5,790,597 A * | 8/1998 | Kurokami et al. | ............ | 375/233 |
| 6,175,588 B1 * | 1/2001 | Visotsky et al. | ............. | 375/148 |
| 6,522,683 B1 * | 2/2003 | Smee et al. | ................... | 375/144 |
| 6,952,561 B1 * | 10/2005 | Kumar et al. | ................ | 455/63.1 |
| 2001/0017900 A1 * | 8/2001 | Schelstraete | ................. | 375/265 |
| 2003/0107582 A1 * | 6/2003 | Maeda et al. | ................ | 345/611 |
| 2006/0034352 A1 * | 2/2006 | Sampath et al. | .............. | 375/148 |

* cited by examiner

*Primary Examiner* — Lihong Yu
(74) *Attorney, Agent, or Firm* — Mendelsohn, Drucker & Dunleavy, P.C.; Kevin M. Drucker; Steve Mendelsohn (57) ABSTRACT

A multi-stage receiver including, in one embodiment, a sequence of processing stages. At least one of the processing stages includes a first processing block, a delay block, and a second processing block. The first processing block is adapted to receive an input signal and generate from the input signal one or more processing parameters. The delay block is adapted to generate a delayed signal. The second processing block is adapted to apply the one or more processing parameters to the delayed signal to generate an output signal. The delay block compensates for one or more processing delays associated with the generation of the one or more processing parameters by the first processing block.

20 Claims, 5 Drawing Sheets

DELAY COMPENSATION IN EQUALIZER-BASED RECEIVER

BACKGROUND OF THE INVENTION

1. Field of the Invention

The present invention relates to data transmission systems, and, in particular, to equalizer-based receivers.

2. Description of the Related Art

Code-Division Multiple-Access (CDMA) systems allow many users simultaneously to access a given frequency allocation. User separation at the receiver is possible because each user spreads its respective modulated data waveform over a wide bandwidth using a unique spreading code, prior to transmitting the waveform. Such spreading typically involves, e.g., multiplying the data waveform with a user-unique high-bandwidth pseudo-noise binary sequence. At the receiving end, the receiver re-multiplies the signal with the pseudo-noise binary sequence to remove substantially all of the pseudo-noise signal, so that the remaining portion of the signal is just the original data waveform. Ordinarily, users spread their signals using codes that are orthogonal to each other, i.e., do not interfere with one another. However, a common problem is inter-symbol interference (ISI), i.e., distortion of a received signal typically manifested in the temporal spreading and consequent overlap of individual pulses from nearby users to the degree that a receiver cannot reliably distinguish between changes of state representing individual signal elements. ISI can present a significant problem if the power level of the desired signal is significantly lower than the power level of the interfering user (e.g., due to distance) and, at a certain threshold, can compromise the integrity of the received data.

One technique for handling ISI is the use of equalizer-based receivers, which are a promising technology for high-speed data transmission systems, such as High-Speed Downlink Packet Access (HSDPA), a standard that is part of the Third-Generation Partnership Project (3GPP). Equalizer-based receivers typically use linear-channel equalizers to restore the orthogonality of spreading sequences lost in frequency-selective channels, thereby suppressing ISI, such as might occur in a downlink operating under the Wide-Band CDMA (WCDMA) standard (a 3GPP technology). Equalizer-based receivers also have the advantage of being of relatively low complexity for short to moderate signal-delay spreads.

The typical 3GPP HSDPA equalizer-based receiver comprises a multi-tap filter coupled to a delay line of received complex data samples, with each filter tap multiplied by a complex weight, followed by a spread-spectrum demodulator and, optionally, a constellation de-mapper. Equalization, demodulation, and de-mapping involve continuously extracting or generating channel parameters from the received signal, and then using these parameters to process the received signal. An intrinsic problem in equalizer-based receivers is that there are performance-degrading time delays between extraction or generation of processing parameters from the received signal and subsequent application of the parameters to the received signal.

Figure 1:
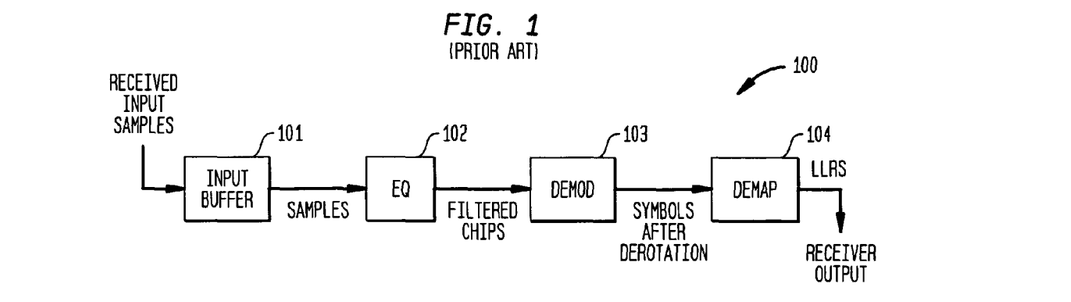
FIG. 1 is a block diagram illustrating an exemplary prior-art equalizer-based receiver.

For example, FIG. 1 illustrates an exemplary prior-art equalizer-based receiver 100, which comprises a plurality of processing stages or blocks: an input buffer 101, an equalizer filter 102, a spread-spectrum demodulator 103, and a symbol de-mapper 104. Input buffer 101 constitutes a delay line for received input samples and outputs delayed samples to equalizer filter 102, which outputs a sequence of filtered chips. Demodulator 103 demodulates (e.g., descrambles, despreads, and de-rotates) the filtered chips, resulting in a sequence of symbols that are provided to de-mapper 104, from which de-mapper 104 derives and outputs a set of Log-Likelihood Ratios (LLRS) as the output of equalizer-based receiver 100. Equalizer filter 102, spread-spectrum demodulator 103, and symbol de-mapper 104 will now be described in further detail with reference to FIGS. 2, 3, and 4.

Figure 2:
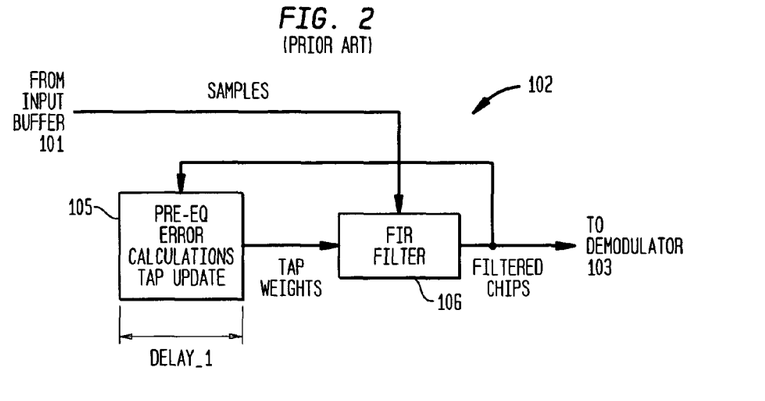
FIG. 2 is a block diagram illustrating the equalizer filter in the equalizer-based receiver of FIG. 1.

With reference now to FIG. 2, equalizer filter 102 is illustrated. Equalizer filter 102 comprises a pre-equalizer block 105 and a Finite-Impulse Response (FIR) filter 106. Pre-equalizer block 105 receives filtered chips from FIR filter 106, which pre-equalizer block 105 uses to calculate an error measure that serves as the basis for updating one or more filter taps of FIR filter 106 by providing a set of tap weights to FIR filter 106. The tap weights might be generated, e.g., by implementing a Least-Mean-Square (LMS) algorithm, as described in K. Hooli, "Equalization in WCDMA Terminals," Ph.D. thesis, Department of Electrical and Information Engineering, University of Oulu, Oulu, Finland, 2003, incorporated herein by reference. FIR filter 106 receives input samples from input buffer 101 and the tap weights from pre-equalizer block 105 and uses a set of complex multiply-and-accumulate (MAC) circuits (not shown) and adders (not shown) to produce the filtered chips that are provided to demodulator 103 and pre-equalizer block 105. The FIR filter tap weights are generated in time delay_1, i.e., the tap weights trail the samples to which the tap weights actually correspond by an amount of time delay_1.

Figure 3:
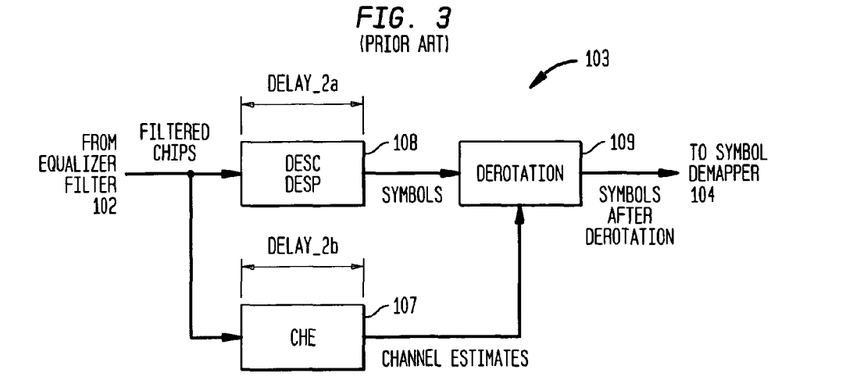
FIG. 3 is a block diagram illustrating the demodulator in the equalizer-based receiver of FIG. 1.

Turning now to FIG. 3, demodulator 103 is illustrated. Demodulator 103 comprises a channel estimator 107, a descrambling and despreading block 108, and a de-rotation block 109. Descrambling and despreading block 108 receives the filtered chips provided by equalizer filter 102 and produces a sequence of symbols, which are provided to de-rotation block 109. De-rotation block 109 de-rotates the symbols using channel-estimation parameters provided by channel estimator 107 and outputs the de-rotated symbols to symbol de-mapper 104. Channel estimator 107 receives the filtered chips provided by equalizer filter 102 and produces the channel-estimation parameters. The symbols provided by descrambling and despreading block 108 are generated in time delay_2a, i.e., the symbols being de-rotated trail the chips to which the symbols correspond by an amount of time delay_2a. The channel-estimation parameters provided by channel estimator 107 to de-rotation block 109 are generated in time delay_2b, i.e., the channel-estimation parameters trail the chips to which the channel-estimation parameters correspond by an amount of time delay_2b. Accordingly, the channel-estimation parameters provided to de-rotation block 109 trail the symbols being de-rotated by an amount of time equal to delay_2b minus delay_2a.

Figure 4:
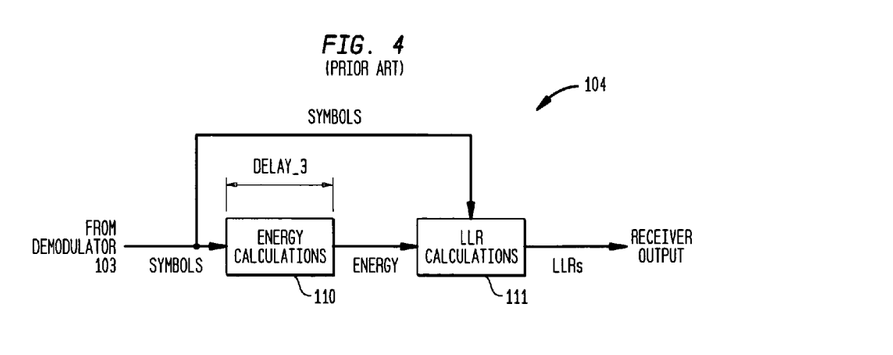
FIG. 4 is a block diagram illustrating the de-mapper in the equalizer-based receiver of FIG. 1.

Now referring to FIG. 4, de-mapper 104 is illustrated. De-mapper 104 comprises an energy calculation block 110 and an LLR (or other metric) calculation block 111. Energy calculation block 110 receives the symbols provided by demodulator 103 and uses these symbols to calculate energy parameters that are provided to LLR calculation block 111. LLR calculation block 111 receives the symbols provided by demodulator 103 and uses these symbols, along with the energy parameters provided by energy calculation block 110, to calculate the LLRs that are provided as the output of equalizer-based receiver 100. The energy parameters provided by energy calculation block 110 to LLR calculation block 111 are generated in time delay_3, i.e., the energy parameters trail the symbols to which the energy parameters actually correspond by an amount of time delay_3.

Thus, it can be seen that the parameters that are generated by blocks 102, 103, and 104 (the tap weights, channel-estimation parameters, and energy parameters, respectively) arrive at their respective processing blocks (blocks 106, 109, and 111) later in time than the samples or symbols to which they are applied during processing. The results of the processing suffer due to the "old" parameters being used to process "new" samples or symbols, introducing latency and error into the processing. When taken together, the cumulative effects of delay_1, delay_2a, delay_2b, and delay_3 result in a significant degradation in performance of equalizer-based receiver 100.

Numerous techniques to improve performance of equalizer-based receivers are known in the art, such as those disclosed in S. Qureshi, "Adaptive Equalization," Processing of IEEE, 1985, incorporated herein by reference, and K. Hooli, "Equalization in WCDMA Terminals," cited above. Such techniques, however, tend to increase significantly the complexity of the receiver in exchange for only a modest performance improvement. Some of these techniques, e.g., lengthening the filter, introduce side effects that adversely affect performance improvement.

SUMMARY OF THE INVENTION

Problems in the prior art are addressed in accordance with the principles of the present invention by providing, in certain embodiments, an equalizer-based receiver with intrinsic delay compensation to improve receiver performance. An exemplary receiver consistent with certain embodiments of the present invention includes one or more delay-compensation blocks, each of which stores and processes signal samples or symbols at one of the various processing stages, such that calculated channel parameters are synchronized to the data from which they were derived.

In one embodiment, the present invention provides a multi-stage receiver having a sequence of processing stages. At least one processing stage comprises a first processing block, a delay block, and a second processing block. The first processing block is adapted to receive an input signal and generate from the input signal one or more processing parameters. The delay block is adapted to generate a delayed signal. The second processing block is adapted to apply the one or more processing parameters to the delayed signal to generate an output signal. The delay block compensates for one or more processing delays associated with the generation of the one or more processing parameters by the first processing block.

In another embodiment, the present invention provides a multi-stage receiver having a sequence of processing stages. The multi-stage receiver comprises an equalizer stage, a demodulator stage, and a demapper stage. The equalizer stage comprises a first processing block adapted to receive an equalizer input signal and generate from the equalizer input signal one or more processing parameters, an equalizer delay block adapted to generate a delayed version of the equalizer input signal, and a second processing block adapted to apply the one or more processing parameters to the delayed version of the equalizer input signal to generate an equalizer output signal. The demodulator stage comprises a first processing block adapted to receive the equalizer output signal and generate from the equalizer output signal one or more processing parameters, a demodulator delay block adapted to generate a delayed version of an intermediate signal based on the equalizer output signal, and a second processing block adapted to apply the one or more processing parameters to the delayed version of the intermediate signal to generate a demodulator output signal. The demapper stage comprises a first processing block adapted to receive the demodulator output signal and generate from the demodulator output signal one or more processing parameters, a demapper delay block adapted to generate a delayed version of the demapper input signal, and a second processing block adapted to apply the one or more processing parameters to the delayed version of the demapper input signal to generate a demapper output signal. Each of the delay blocks compensates for processing delays associated with the generation of the one or more processing parameters by the respective first processing block.

In still another embodiment, the present invention provides a method of processing one or more received signals. The method comprises: receiving an input signal and generating from the input signal one or more processing parameters; generating a delayed signal; and applying the one or more processing parameters to the delayed signal to generate an output signal. The generation of the delayed signal compensates for processing delays associated with the generation of the one or more processing parameters.

In a further embodiment, the present invention provides a method of processing one or more received signals. The method comprises: receiving an equalizer input signal and generating from the equalizer input signal one or more processing parameters; generating a delayed version of the equalizer input signal; applying the one or more processing parameters to the delayed version of the equalizer input signal to generate an equalizer output signal; generating from the equalizer output signal one or more processing parameters; generating a delayed version of an intermediate signal based on the equalizer output signal; applying the one or more processing parameters to the delayed version of the intermediate signal to generate a demodulator output signal; generating from the demodulator output signal one or more processing parameters; generating a delayed version of the demodulator output signal; and applying the one or more processing parameters to the delayed version of the demodulator output signal to generate a demapper output signal. Each of the delayed signal versions compensates for a processing delay associated with the generation of the respective one or more processing parameters.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 5:
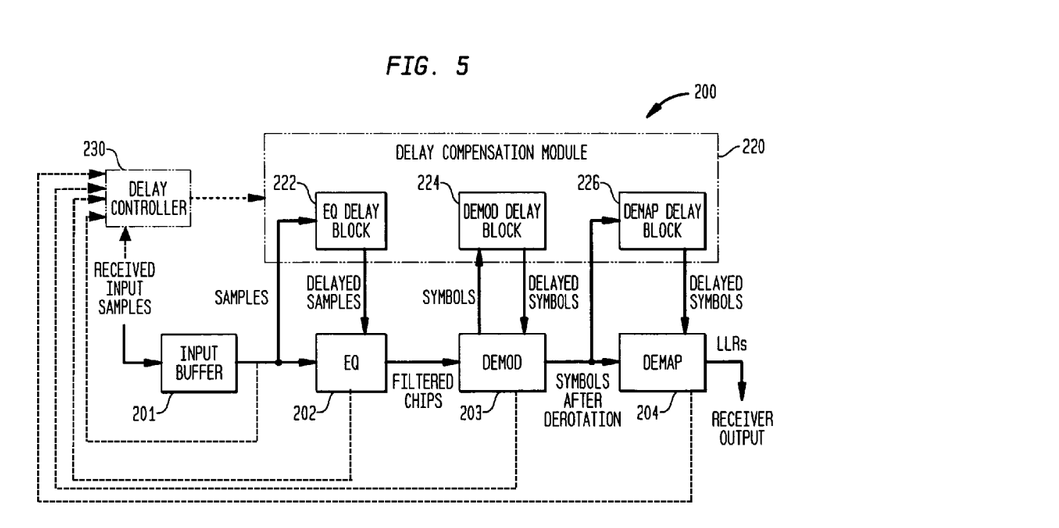
FIG. 5 is a block diagram illustrating the exemplary equalizer-based receiver with delay compensation, consistent with one embodiment of the present invention.

Turning now to FIG. 5, an exemplary equalizer-based receiver 200 with delay compensation, consistent with one embodiment of the present invention, is illustrated. Equalizer-based receiver 200 comprises a plurality of processing blocks: an input buffer 201, an equalizer filter 202, a spread-spectrum demodulator 203, a symbol de-mapper 204, and a delay compensation module 220. Delay compensation module 220 includes an equalizer delay block 222, a demodulator delay block 224, and a de-mapper delay block 226, which delay signals at equalizer filter 202, spread-spectrum demodulator 203, and symbol de-mapper 204, respectively. The delay times for blocks 222, 224, and 226 are determined to be, e.g., the number of clock cycles of delay needed to cause the channel parameters calculated in blocks 202, 203, and 204 to be synchronized with the signals that blocks 202, 203, and 204, respectively, are processing.

Input buffer 201 constitutes a delay line for received input samples and outputs delayed samples to equalizer delay block 222 and to equalizer 202. Delay block 222 outputs delayed samples to equalizer filter 202. Equalizer filter 202 outputs filtered chips to demodulator 203. Demodulator 203 demodulates (e.g., descrambles, despreads, and de-rotates) the filtered chips, resulting in a sequence of symbols that are provided to de-mapper 204. During the demodulation process, demodulator 203 provides symbols to demodulator delay block 224, and demodulator delay block 224 provides delayed symbols back to demodulator 203. The symbols provided by demodulator 203 are used by de-mapper 204 to derive and output a set of Log-Likelihood Ratios (LLRs) (or other metric) as the output of equalizer-based receiver 200. The symbols from demodulator 203 are also used by de-mapper delay block 226 to provide delayed symbols to de-mapper 204. Equalizer filter 202, spread-spectrum demodulator 203, and symbol de-mapper 204 will now be described in further detail with reference to FIGS. 6, 7, and 8.

Figure 6:
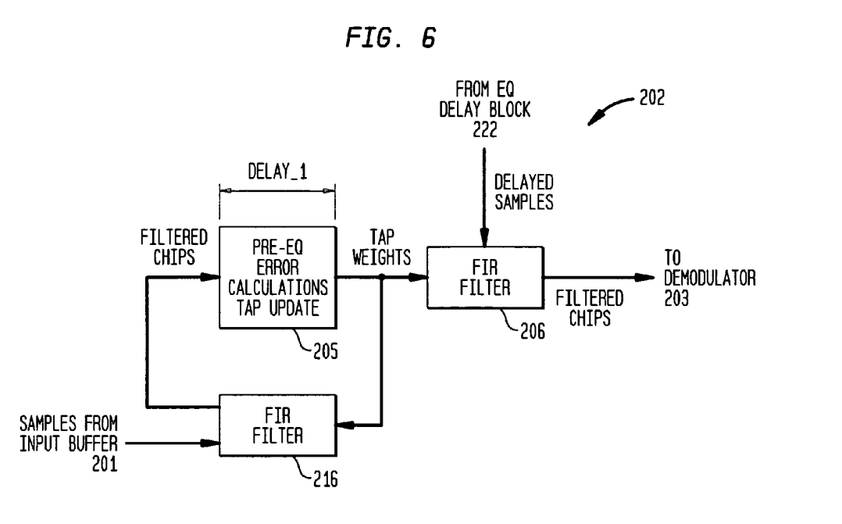
FIG. 6 is a block diagram illustrating the equalizer filter with delay compensation in the equalizer-based receiver of FIG. 5.

With reference now to FIG. 6, equalizer filter 202 is illustrated. Equalizer filter 202 comprises a pre-equalizer block 205 and two Finite-Impulse Response (FIR) filters 206, 216. Each FIR filter 206, 216 uses a set of complex multiply-and-accumulate (MAC) circuits (not shown) and adders (not shown) to produce a set of filtered chips. FIR filter 216 receives samples from input buffer 201 and tap weights from pre-equalizer block 205 and generates and provides filtered chips to pre-equalizer block 205. FIR filter 206 receives delayed samples from equalizer delay block 222 and the tap weights from pre-equalizer block 205 and generates and provides filtered chips to demodulator 203. Thus, FIR filter 216 generates filtered chips based on parameters extracted from non-delayed samples, while FIR filter 206 generates filtered chips based on parameters extracted from delayed samples. Pre-equalizer block 205 receives and uses the filtered chips provided by FIR filter 216 to calculate an error measure that serves as the basis for updating one or more filter taps of both FIR filters 206, 216 by providing a set of tap weights to FIR filters 206, 216. The tap weights might be generated, e.g., by implementing a Least-Mean-Square (LMS) algorithm, as described in K. Hooli, "Equalization in WCDMA Terminals," cited above. Equalizer delay block 222 provides to FIR filter 206 delayed input samples, which FIR filter 206 receives concurrently with the corresponding tap weights from block 205. Since the FIR filter tap weights are generated in time delay_1, equalizer delay block 222 delays the provision of samples to FIR filter 206 by time delay_1, so that FIR filter 206 can apply the tap weights concurrently with the receipt of the samples to which the tap weights actually correspond.

Figure 7:
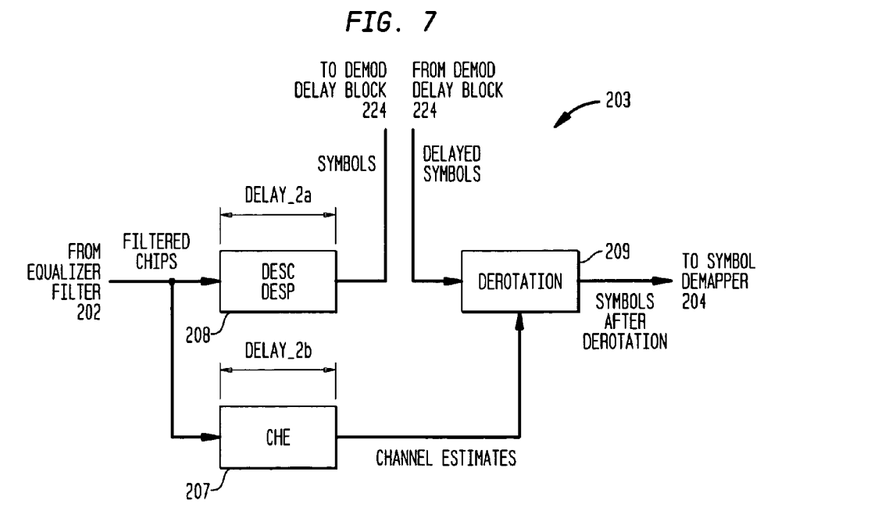
FIG. 7 is a block diagram illustrating the demodulator with delay compensation in the equalizer-based receiver of FIG. 5.

Turning now to FIG. 7, demodulator 203 is illustrated. Demodulator 203 comprises a channel estimator 207, a descrambling and despreading block 208, and a de-rotation block 209. Descrambling and despreading block 208 receives the filtered chips provided by equalizer filter 202 and produces a sequence of symbols, which are provided to demodulator delay block 224. Demodulator delay block 224 provides delayed symbols to de-rotation block 209. De-rotation block 209 de-rotates the symbols using channel-estimation parameters provided by channel estimator 207 and outputs the de-rotated symbols to symbol de-mapper 204. Descrambling and despreading block 208 receives the filtered chips provided by equalizer filter 202 and produces the channel-estimation parameters. The symbols provided by descrambling and despreading block 208 are generated from the filtered chips from equalizer filter 202 in time delay_2a, and the channel-estimation parameters provided by channel estimator 207 to de-rotation block 209 are generated from the filtered chips from equalizer filter 202 in time delay_2b. Accordingly, demodulator delay block 224 delays the provision of symbols to de-rotation block 209 by an amount of time equal to delay_2b minus delay_2a, so that de-rotation block 209 can apply the channel-estimation parameters concurrently with the receipt of the symbols to which the channel-estimation parameters actually correspond.

Figure 8:
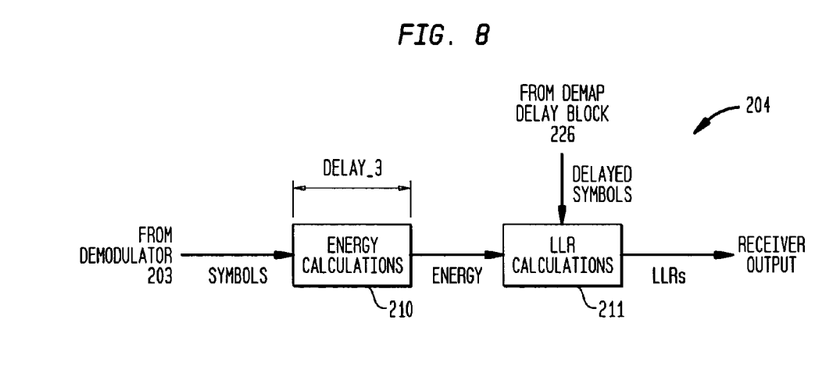
FIG. 8 is a block diagram illustrating the de-mapper with delay compensation in the equalizer-based receiver of FIG. 5.

Now referring to FIG. 8, de-mapper 204 is illustrated. De-mapper 204 comprises an energy calculation block 210 and an LLR calculation block 211. Energy calculation block 210 receives the symbols provided by demodulator 203 and uses these symbols to calculate energy parameters that are provided to LLR calculation block 211. LLR calculation block 211 receives delayed symbols provided by de-mapper delay block 226 and uses these symbols, along with the energy parameters provided by energy calculation block 210, to calculate the LLRs that are provided as the output of equalizer-based receiver 200. Since the energy parameters provided by energy calculation block 210 to LLR calculation block 211 are generated in time delay_3, de-mapper delay block 226 delays the provision of symbols to LLR calculation block 211 by time delay_3, so that LLR calculation block 211 can apply the energy parameters concurrently with the receipt of the symbols to which the energy parameters actually correspond.

Thus, to avoid the cumulative effects of delay_1, delay_2a, delay_2b, and delay_3, resulting in a degradation in performance of equalizer-based receiver 200, the respective delays injected by delay blocks 222, 224, and 226 synchronize the samples or symbols being processed to yield overall improved performance. While this delay compensation introduces latency in the processing of samples and may require additional hardware, the performance improvement in many applications justifies the latency and additional hardware.

The durations of delay_1, delay_2a, delay_2b, and delay_3 depend on the actual implementation of tap update logic, despreader logic, channel estimate logic and energy calculation logic, respectively. Accordingly, once such logic is implemented, the corresponding delay can be determined by simulation of such logic by a simulation tool. Once the delay duration is determined, a shift register comprising, e.g., back-to-back flip-flops, can be employed in each of delay blocks 222, 224, and 226 to provide the appropriate delay. Other delay elements could alternatively be used to implement the appropriate delay, e.g., multiplexers or inverters.

In certain embodiments in which the delay durations may be subject to fluctuation, the delay durations in the shift registers could be updated periodically or continuously by means of adaptive control. In this scenario, additional delay-sensing and/or programmable delay circuitry, such as delay controller 230 (shown in broken lines), would receive the same samples that are received by input buffer 201 and/or equalizer 202 and/or other information, e.g., from one or more of blocks 202, 203, and 204, and determine the current delay that should be implemented by one or more of blocks 222, 224, and/or 226.

The stages or blocks in a receiver consistent with the present invention could be ordered in a number of different ways and are not limited to the order shown or described herein. Some stages might be omitted in various embodiments, and other stages not described herein could be added, including other stages to which delay compensation is applied, just as with stages 202, 203, and 204. Other arrangements are possible. For example, FIR filter 216 could be implemented as part of equalizer delay block 222.

It should be recognized that delay blocks 222, 224, and 226 could be components of a single delay compensation module 220, as shown in FIG. 5, or could alternatively be separate, individual components or modules. One or more of the delay blocks could alternatively be included as part of their respective processing blocks (i.e., within blocks 202, 203, and/or 204). The delay elements are not limited to the particular structures shown in the figures or described herein and could be implemented in other ways, consistent with various embodiments of the present invention. It should further be recognized that in alternative embodiments of an equalizer-based receiver consistent with the invention, only one or two of delay blocks 222, 224, and 226 could be provided, still yielding performance improvement.

Figure 9:
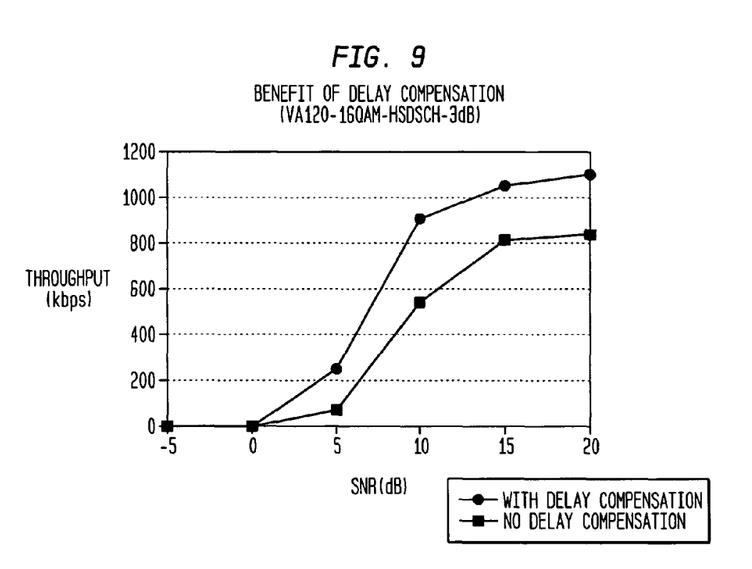
FIG. 9 is a graph of simulation results for a exemplary receiver consistent with one embodiment of the present invention, for a 16-Quadrature Amplitude Modulation (QAM) constellation in a High-Speed Downlink Shared Channel (HSDSCH) application.
Figure 10:
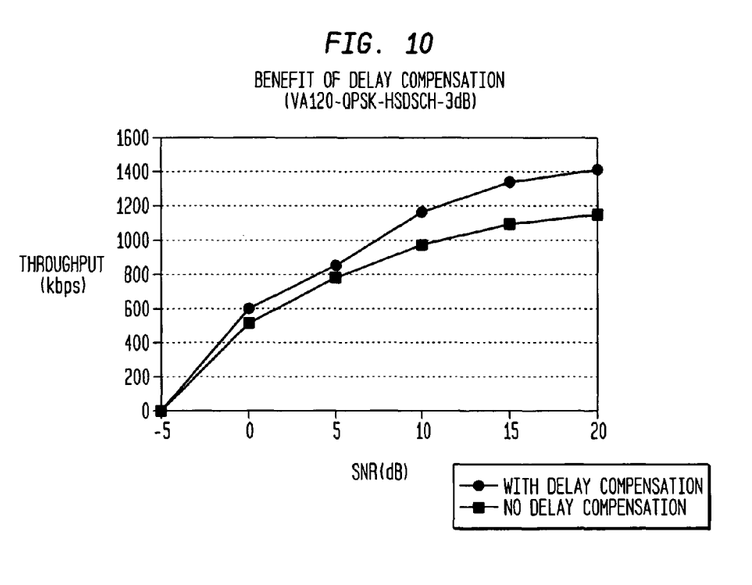
FIG. 10 is a graph of simulation results for a exemplary receiver consistent with one embodiment of the present invention, for a Quadrature Phase Shift Keying (QPSK) constellation in an HSDSCH application.

Turning now to FIGS. 9 and 10, simulation results for an exemplary receiver consistent with one embodiment of the present invention are shown for a 16-Quadrature Amplitude Modulation (QAM) constellation and a Quadrature Phase Shift Keying (QPSK) constellation, respectively, in a High-Speed Downlink Shared Channel (HSDSCH) application. In this simulation, the receiver includes only demodulator delay block 224 and de-mapper delay block 226 (but not equalizer delay block 222). It can be seen from these results that a delay compensation scheme consistent with the present invention can provide a significant and measurable performance benefit.

While the embodiments of the present invention described herein are in the context of equalizer-based receivers and their corresponding processing blocks (equalizer filter, symbol demodulator, and demapper), it should be understood that delay compensation apparatus or methods consistent with alternative embodiments of the present invention may have utility with other types of receivers that suffer performance-degrading delays between extraction or generation of processing parameters from a received signal and application of the parameters to the received signal, as well as other non-receiver devices.

The present invention may be implemented as circuit-based processes, including possible implementation as a single integrated circuit (such as an ASIC or an FPGA), a multi-chip module, a single card, or a multi-card circuit pack.

As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A multi-stage receiver having a sequence of processing stages, at least one processing stage comprising:
   a first processing block adapted to receive an input signal and generate from the input signal one or more processing parameters;
   a delay controller adapted to generate a delay value based on either a receiver input signal or a processed version of the receiver input signal;
   a delay block adapted to generate a delayed signal from an original signal based on the delay value; and
   a second processing block adapted to apply the one or more processing parameters to the delayed signal to generate an output signal, wherein:
   the delay block compensates for one or more processing delays associated with the generation of the one or more processing parameters by the first processing block, and
   the delay controller is adapted to select the delay value for the delay block by calculating a processing delay associated with the generation of the one or more processing parameters by the first processing block.

2. The invention of claim 1, wherein:
   the at least one processing stage is an equalizer;
   the input signal is an equalizer input signal;
   the output signal is an equalizer output signal; and the delayed signal comprises a delayed version of the equalizer input signal.

3. The invention of claim 2, wherein the equalizer comprises:
a tap generator adapted to generate tap weights based on the equalizer input signal;
a first filter adapted to generate filtered chips based on the equalizer input signal and the tap weights; and
a second filter adapted to generate the equalizer output signal based on the delayed version of the equalizer input signal and the tap weights.

4. The invention of claim 1, wherein:
the at least one processing stage is a demodulator;
the input signal is a demodulator input signal;
the output signal is a demodulator output signal; and
the delayed signal comprises a delayed version of an intermediate signal used to generate the demodulator output signal.

5. The invention of claim 4, wherein the demodulator comprises:
a descrambling/despreading block adapted to generate the intermediate signal, wherein the intermediate signal comprises symbols and is based on the demodulator input signal;
a channel estimator adapted to generate one or more channel-estimation parameters based on the demodulator input signal; and
a derotation block adapted to generate the demodulator output signal based on the delayed signal and the one or more channel-estimation parameters.

6. The invention of claim 1, wherein:
the at least one processing stage is a demapper;
the input signal is a demapper input signal;
the output signal is a demapper output signal; and
the delayed signal comprises a delayed version of the demapper input signal.

7. The invention of claim 6, wherein the demapper comprises:
an energy calculator adapted to generate energy parameters based on the demapper input signal; and
a metric calculator adapted to generate the demapper output signal based on the delayed version of the demapper input signal and the energy parameters.

8. The invention of claim 1, wherein the delay block is a programmable delay block adapted to be configured to provide a selectable delay value.

9. A method of processing one or more received signals, the method comprising:
generating, based on a receiver input signal, an equalizer delay value, a demodulator delay value, and a demapper delay value;
receiving an equalizer input signal and generating from the equalizer input signal one or more processing parameters;
calculating a processing delay associated with the generation of the one or more processing parameters from the equalizer input signal;
generating a delayed version of the equalizer input signal based on the equalizer delay value, wherein the equalizer delay value is selected based on the calculated processing delay associated with the generation of the one or more processing parameters from the equalizer input signal;
applying the one or more processing parameters to the delayed version of the equalizer input signal to generate an equalizer output signal;
generating from the equalizer output signal one or more processing parameters;
calculating a processing delay associated with the generation of the one or more processing parameters from the equalizer output signal;
generating a delayed version of an intermediate signal based on the equalizer output signal and the demodulator delay value, wherein the demodulator delay value is selected based on the calculated processing delay associated with the generation of the one or more processing parameters from the equalizer output signal;
applying the one or more processing parameters to the delayed version of the intermediate signal to generate a demodulator output signal;
generating from the demodulator output signal one or more processing parameters;
calculating a processing delay associated with the generation of the one or more processing parameters from the demodulator output signal;
generating a delayed version of the demodulator output signal based on the demapper delay value, wherein the demapper delay value is selected based on the calculated processing delay associated with the generation of the one or more processing parameters from the demodulator output signal; and
applying the one or more processing parameters to the delayed version of the demodulator output signal to generate a demapper output signal;
wherein each of the delayed signal versions compensates for a processing delay associated with the generation of the respective one or more processing parameters.

10. A multi-stage receiver having a sequence of processing stages, the multi-stage receiver comprising:
(i) a delay controller adapted to generate, from a receiver input signal, an equalizer delay value, a demodulator delay value, and a demapper delay value;
(ii) an equalizer stage comprising:
a first processing block adapted to receive an equalizer input signal and generate from the equalizer input signal one or more processing parameters;
an equalizer delay block adapted to generate a delayed version of the equalizer input signal based on the equalizer delay value; and
a second processing block adapted to apply the one or more processing parameters to the delayed version of the equalizer input signal to generate an equalizer output signal;
(iii) a demodulator stage comprising:
a first processing block adapted to receive the equalizer output signal and generate from the equalizer output signal one or more processing parameters;
a demodulator delay block adapted to generate a delayed version of an intermediate signal based on the equalizer output signal and the demodulator delay value; and
a second processing block adapted to apply the one or more processing parameters to the delayed version of the intermediate signal to generate a demodulator output signal; and
(iv) a demapper stage comprising:
a first processing block adapted to receive the demodulator output signal and generate from the demodulator output signal one or more processing parameters;
a demapper delay block adapted to generate a delayed version of the demapper input signal based on the demapper delay value; and a second processing block adapted to apply the one or more processing parameters to the delayed version of the demapper input signal to generate a demapper output signal;

wherein:

each of the delay blocks compensates for processing delays associated with the generation of the one or more processing parameters by the respective first processing block; and the delay controller is adapted to select the delay value for each delay block by calculating a processing delay associated with the generation of the one or more processing parameters by the respective processing block.

11. The invention of claim 10, wherein:

the equalizer comprises:

a tap generator adapted to generate tap weights based on the equalizer input signal;

a first filter adapted to generate filtered chips based on the equalizer input signal and the tap weights; and a second filter adapted to generate the equalizer output signal based on the delayed version of the equalizer input signal and the tap weights;

the demodulator comprises:

a descrambling/despreading block adapted to generate the intermediate signal, wherein the intermediate signal comprises symbols;

a channel estimator adapted to generate one or more channel-estimation parameters based on the equalizer output signal; and a derotation block adapted to generate the demodulator output signal based on the delayed version of the intermediate signal and the one or more channel-estimation parameters; and the demapper comprises:

an energy calculator adapted to generate energy parameters based on the demodulator output signal; and a metric calculator adapted to generate the demapper output signal based on the delayed version of the demodulator output signal and the energy parameters.

12. A receiver-implemented method of processing one or more received signals, the method comprising:

(a) the receiver receiving an input signal and generating from the input signal one or more processing parameters;

(b) the receiver calculating a processing delay associated with the generation of the one or more processing parameters;

(c) the receiver generating a delay value based on either the input signal or a processed version of the input signal;

(d) the receiver generating a delayed signal from an original signal based on the delay value; and (e) the receiver applying the one or more processing parameters to the delayed signal to generate an output signal;

wherein:

the generation of the delayed signal compensates for processing delays associated with the generation of the one or more processing parameters; and the delay value is selected based on the calculated processing delay.

13. The invention of claim 12, wherein:

the one or more processing parameters are generated by an equalizer;

the input signal is an equalizer input signal;

the output signal is an equalizer output signal; and the delayed signal comprises a delayed version of the equalizer input signal.

14. The invention of claim 13, wherein step (e) further comprises:

the receiver generating tap weights based on the equalizer input signal;

the receiver generating filtered chips based on the equalizer input signal and the tap weights; and the receiver generating the equalizer output signal based on the delayed version of the equalizer input signal and the tap weights.

15. The invention of claim 12, wherein:

the one or more processing parameters are generated by a demodulator;

the input signal is a demodulator input signal;

the output signal is a demodulator output signal; and the delayed signal comprises a delayed version of an intermediate signal used to generate the demodulator output signal.

16. The invention of claim 15, wherein step (e) further comprises:

the receiver generating the intermediate signal, wherein the intermediate signal comprises symbols and is based on the demodulator input signal;

the receiver providing the delayed signal;

the receiver generating one or more channel-estimation parameters based on the demodulator input signal; and the receiver generating the demodulator output signal based on the delayed signal and the one or more channel-estimation parameters.

17. The invention of claim 12, wherein:

the one or more processing parameters are generated by a demapper;

the input signal is a demapper input signal;

the output signal is a demapper output signal; and the delayed signal comprises a delayed version of the demapper input signal.

18. The invention of claim 17, wherein step (e) further comprises:

the receiver generating energy parameters based on the demapper input signal; and the receiver generating the demapper output signal based on the delayed version of the demapper input signal and the energy parameters.

19. The invention of claim 12, further comprising:

the receiver programming a delay block to provide a selectable delay value.

20. The invention of claim 19, further comprising:

the receiver selecting the delay value for the delay block by calculating a processing delay associated with the generation of the one or more processing parameters.

* * * * *